(12) United States Patent
Ansaloni et al.

(10) Patent No.: US 9,158,682 B2
(45) Date of Patent: Oct. 13, 2015

(54) CACHE MEMORY GARBAGE COLLECTOR

(71) Applicant: International Business Machines Corporation, Armonk, NY (US)

(72) Inventors: Danilo Ansaloni, Horgen (CH); Florian A Auernhammer, Adliswil (CH); Andreas C Doering, Zufikon (CH); Patricia M Sagmeister, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 13/751,234

(22) Filed: Jan. 28, 2013

(65) Prior Publication Data
US 2013/0198455 A1   Aug. 1, 2013

(30) Foreign Application Priority Data

Jan. 31, 2012   (GB) .................................. 1201594.7

(51) Int. Cl.
*G06F 12/02* (2006.01)
*G06F 12/12* (2006.01)

(52) U.S. Cl.
CPC ........ *G06F 12/0261* (2013.01); *G06F 12/0253* (2013.01); *G06F 12/121* (2013.01); *Y02B 60/1225* (2013.01)

(58) Field of Classification Search
CPC ............ G06F 11/1451; G06F 11/2064; G06F 11/2082; G06F 12/00; G06F 12/12; G06F 12/08; G06F 12/122; G06F 12/02; G06F 12/10; G06F 12/0238; G06F 17/30215; G06F 17/30578; G06F 2201/84
See application file for complete search history.

(56) References Cited

U.S. PATENT DOCUMENTS

| | | | |
|---|---|---|---|
| 6,353,838 B2 * | 3/2002 | Sauntry et al. ........................ 1/1 |
| 7,069,279 B1 * | 6/2006 | Rau et al. ............................... 1/1 |
| 7,483,930 B1 * | 1/2009 | Wright et al. ........................... 1/1 |
| 2007/0113014 A1 * | 5/2007 | Manolov et al. .............. 711/133 |
| 2010/0082930 A1 * | 4/2010 | Jiva et al. ...................... 711/166 |
| 2010/0223429 A1 * | 9/2010 | Cher et al. .................... 711/122 |

OTHER PUBLICATIONS

Chang et al., Evaluation of an Object-Caching Coprocessor Design for Object-Oriented Systems, 1993, pp. 132-139, Raleigh, N.C.
Yau et al., Hardware Concurrent Garbage Collection for Short-Lived Objects in Mobile Java Devices, 2005, pp. 47-56, Hong Kong.

* cited by examiner

*Primary Examiner* — Mardochee Chery
*Assistant Examiner* — Jean Edouard
(74) *Attorney, Agent, or Firm* — Cantor Colburn LLP

(57) ABSTRACT

A method for managing objects stored in a cache memory of a processing unit. The cache memory includes a set of entries corresponding to an object. The method includes: checking, for each entry of at least a subset of entries of the set of entries of the cache memory, whether an object corresponding to each entry includes one or more references to one or more other objects stored in the cache memory and storing the references; determining among the objects stored in the cache memory, which objects are not referenced by other objects, based on the stored references; marking entries as checked to distinguish entries corresponding to objects determined as being not referenced from other entries of the checked entries, and casting out, according to the marking, entries corresponding to objects determined as being not referenced.

17 Claims, 2 Drawing Sheets

CACHE MEMORY GARBAGE COLLECTOR

CROSS REFERENCE TO RELATED APPLICATION

This application claims priority under 35 U.S.C. 119 from European Application 1201594.7, filed Jan. 31, 2012, the entire contents of which are incorporated herein by reference.

BACKGROUND OF THE INVENTION

1. Field of the Invention

This invention relates to memory management in computer systems and more particularly to garbage collection in a cache memory system.

2. Description of the Related Art

Modern dynamic and object-oriented languages use data structures that consist of small data objects referenced by pointers. The references to objects change quickly during the execution of a program, leaving objects with few or no references.

Garbage collection is a method to reuse memory that is occupied by data objects that are not referenced anymore. It is a form of automatic memory management. It is well known and has been improved over time. Garbage collection simplifies either the programming and/or enables algorithms that cannot keep track of object references efficiently. Garbage collection marks all objects that have a reference to it and reuses the memory that is occupied by all other objects. This assumes that the garbage collector can check all possible references. Hence, garbage collection allows data objects to be found in a program that cannot be accessed in the future, and reclaim the resources used by those objects.

The document U.S. Pat. No. 7,069,279 (B1) discloses a garbage collector for performing garbage collection that, from time to time, and within a single cycle, determines objects that are eligible to have their associated memory freed. The garbage collector relies on high-priority finalizers for determining eligible objects that are marked as ready for deallocation. The garbage collector, during a subsequent cycle, then deallocates the memory associated with marked objects.

The document U.S. Pat. No. 6,353,838 (B2) discloses an incremental garbage collector wherein, upon termination of a function or program, the incremental garbage collector scans the object heap for objects allocated by the function or program that are not referenced outside the function or program that allocated the objects. Memory occupied by such objects is immediately reclaimed without having to wait for the garbage collector.

BRIEF SUMMARY OF THE INVENTION

According to a first aspect, the present invention provides a method for managing objects stored in a cache memory of a processing unit, wherein the cache memory includes a set of entries, each of the entries corresponding to an object of the objects, the method including: checking, for each entry of at least a subset of entries of the set of entries of the cache memory, whether the object corresponding to each entry includes at least one reference to at least one other object stored in the cache memory, and storing the references; determining among the objects stored in the cache memory, which objects are not referenced by other objects, based on the stored references; marking entries as checked to distinguish entries corresponding to objects determined as being not referenced from other entries of the checked entries; and, casting out according to the marking, entries corresponding to objects determined as being not referenced.

According to another aspect, the present invention provides a system for implementing a garbage collector on a processing unit cache memory, including: a first interface for read and write access to the cache memory; a second interface for read access to a memory management unit of the processing unit; a third interface for receiving register assignments performed in the processing unit; a memory for storing at least one reference to at least one object; and, a processing engine for managing the objects stored in the processing unit cache memory, wherein the cache memory includes a set of entries, each of the entries corresponding to an object of the objects.

BRIEF DESCRIPTION OF THE SEVERAL VIEWS OF THE DRAWINGS

A system and a process embodying the invention will now be described, by way of non-limiting example, and in reference to the accompanying drawings, wherein.

DETAILED DESCRIPTION OF THE PREFERRED EMBODIMENTS

Figure 1:
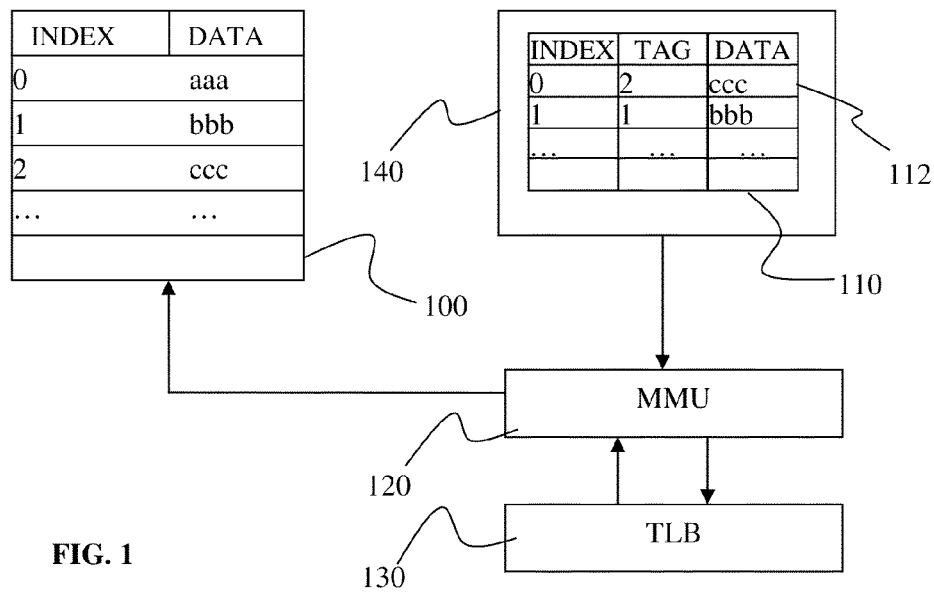
FIG. 1 is an example of CPU cache memory.

As will be appreciated by one skilled in the art, aspects of the present invention can be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable non-transient program code embodied thereon.

Any combination of one or more computer readable medium(s) may be utilized. The computer readable medium may be a computer readable signal medium or a computer readable storage medium. A computer readable storage medium can be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium includes the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium can include a propagated data signal with computer readable non-transient program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Non-transient program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The non-transient program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, the principles of operation of a cache memory as known in the art are illustrated. Two memories are illustrated on FIG. 1: a main memory 100 external to the CPU 140 and a cache memory 110 integrated with the CPU 140. The CPU 140 can include one or more of a cache memory, with only one cache memory being represented on FIG. 1. Both memories 100 and 110 include one or more cache entries. A cache entry can include data and an index. An index is a unique number used to refer to the location of the data on the memory. The index is as also called physical address for the main memory 100 and virtual address for the cache memory 110. An entry in the cache memory can further include a tag which contains the index of the data in the main memory that has been cached. The tag can contain the most significant bits of the index of the data in the main memory.

When the processor 140 needs to read or write in a location of the main memory 100, it first checks whether the memory location is in the cache by comparing the address of the memory location to all tags in the cache. A cache hit can occur when the address location is found in the cache memory; for instance the tag 2 related to the index 0 in the cache memory 110 of FIG. 1. On the contrary, a cache miss occurs when the address location is not found in the cache memory; for instance the index 0 in the main memory 100 of FIG. 1. In the event of a cache miss, the cache allocates a new entry, which includes the tag just missed and a copy of the data.

Because applications running on the CPU use virtual memory, the CPU has to implement some form of virtual memory: the CPU translates virtual addresses used and generated by the application into physical addresses in main memory. Otherwise said, processor functional units operate with virtual addresses, but cache and operating memory controllers have to deal with physical addresses. Most caches are tagged physically, but some may be tagged virtually. The translation is performed by the memory management unit (MMU) 120 in association with the translation lookaside buffer (TLB) 130.

It is to be noted that FIG. 1 shows conventional arrangements of cache and main memories as known in the art, but these arrangements do not change the essential features of the invention which are independent of cache and main memories arrangements.

Figure 2:
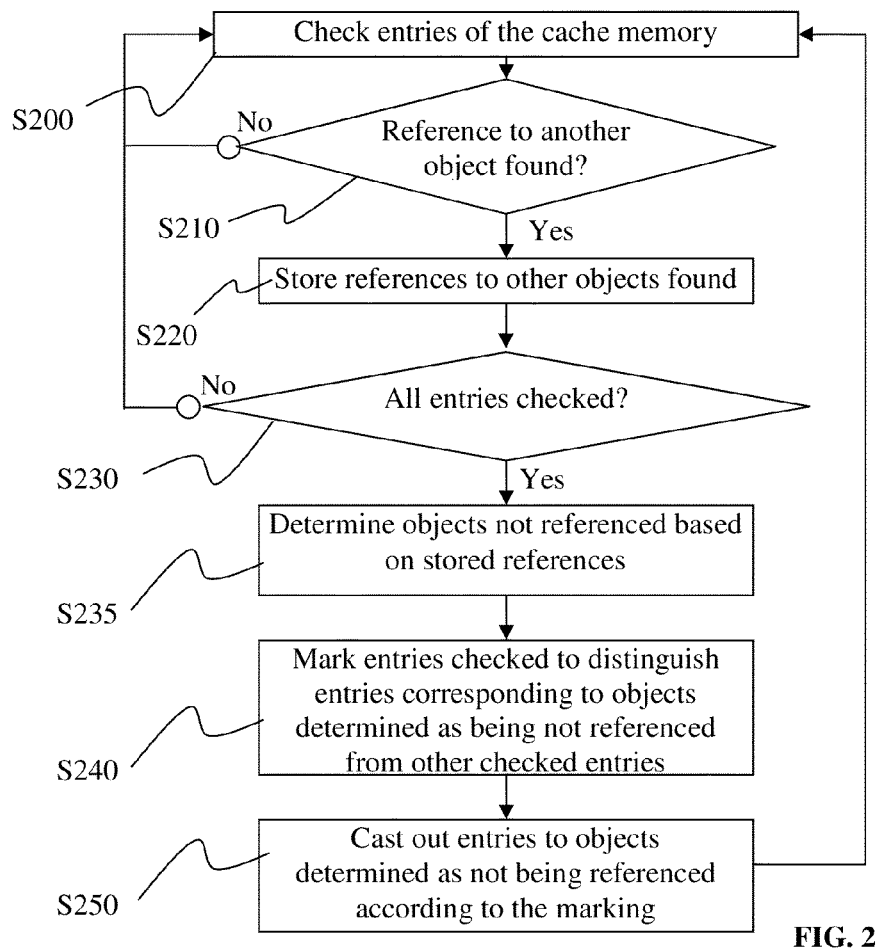
FIG. 2 is flowchart depicting an embodiment of a method for managing objects stored on a cache memory of a processing unit.

FIG. 2 illustrates an embodiment of a method for managing objects stored in a cache memory of a processing unit, e.g. the CPU illustrated on FIG. 1. The cache memory includes a set of entries, and each entry corresponds to an object. The cache entry can be, but is not limited to, a cache line or a cache block.

At step S200, whether the objects stored in the cache memory includes one or more references to one or more other objects stored in the cache memory is checked. Checking means that an inspection is performed on entries of the cache memory. The checking can indifferently be performed either on each entry of the cache memory or at least on a subset of entries of a set of entries of the cache memory. Performing the checking on a subset of entries may be helpful when the workload on the cache memory is important. Performing checking on each entry allows the cache to be freed-up more efficiently and much faster. For the sake of explanation only, the following description of FIG. 2 now refers to a checking step performed on each entry of the cache memory.

Checking each entry (or at least on a subset of entries of a set of entries) can be performed in several ways. For instance, it can be performed line by line: the cache memory forms a stack of lines, and consecutive lines forming the stack are checked. In another embodiment, entries of the cache memory can be checked in a random order. In yet another embodiment, more than one line can be simultaneously checked, for instance, two or three consecutive or non-consecutive lines can be checked at the same time. In all of these embodiments, all the lines of the cache memory are checked.

The checking step S200 leads to determining, at step S210, whether the objects stored in the entries of the cache memory include one or more references to one or more other objects stored in the cache memory. A reference can be a pointer, that is, a data type whose value refers directly to another value stored elsewhere in the computer memory. In practice, the reference can be a cache memory address. Otherwise said, at step S200, for each entry of the cache memory, a search is performed for whether an object stored in an entry makes reference to one or more addresses of one or more other objects stored in the cache memory.

At the checking step S210, the references may be located in each object stored on each entry of the cache memory. This involves the ability to identify the one or more references in the object. There may be different ways for performing such identification in an object. Two examples for identifying one or more references in an object are now described.

In the event that type information of the objects is available, the checking step can include locating in each entry of the cache memory the one or more references to one or more other objects by identifying the type information of the object to determine the size of the object. As the size of the object is known, it is therefore possible to distinguish which variables in the stack or fields in an object are regular values and which are references.

In the event that type information of the objects is not available, it may be more difficult to locate references because each pattern in cache memory could be a reference. This can be for instance the case with languages that are weakly typed, and thus do not allow determination of the type of the objects and, therefore their size and location of the references they can contain. To this aim, the location of one or more references in an entry of the cache memory can be carried out by performing the two following consecutive steps.

In a first step, an address range in the cache memory is selected. The address range can be selected so that the given probability of coinciding with application data is very low: indeed, current systems use 64-bit pointers that do not necessarily have the same length as data types such as integers and the workspace of the applications is much smaller. The probability that the address range coincides with application data strongly depends on the application; in particular, it depends on how the application manages the memory and how the memory is allocated to the application in accordance with memory management of the operating system. Therefore, the range of valid memory addresses represents a tiny fraction of the range of 64-bit values, and an arbitrary 64-bit pattern is unlikely to mimic a valid pointer. In practice, it works fairly well because most integers are small and most pointers look like large integers.

In a second step, once the address range in the cache memory has been selected, words that belong to the selected address range are identified. The identification can be performed in accordance with data alignment of the cache memory, that is, in accordance with constraints on the address of an object stored in the cache memory. In other terms, each word that falls into the selected address range and that has the appropriate alignment can be assumed to be a reference. Advantageously, it is noticeable that even in the unlikely event that the selected address range partly coincides with application data, the presented method can nevertheless be performed.

Once one or more references have been located in an object corresponding to an entry of the cache memory, the located reference(s) can be confirmed upon requesting the memory unit management unit (MMU) of the processing unit, e.g. MMU 120 of the CPU 140 depicted on FIG. 1. The request sent to the MMU includes the reference(s) found in the object, e.g. a virtual address used by an object of an application, and, in turn, the MMU sends a physical address—the result of the translation of this virtual address into a physical address of the cache memory. Thus, the MMU is able to make the translation between the reference(s) found in the object and a physical address of the cache memory. This includes that the reference(s) located is a true reference.

In the event the translation fails, the reference(s) found in the object can be evaluated as being regular data, that is, not a reference. The cache memory is not modified.

As previously discussed, the address range of the cache memory can be selected, meaning the address range can be enlarged, or on the contrary can be reduced. There are at least two ways to select the address range. Two examples for selecting an address range are now discussed.

The address range can be configured by an operating system or an application executed by the processing unit. For instance, the operating system systems can run the process in a dedicated address space where the operating system selects the address range of the process, e.g. the process of an application.

Alternatively, the selection of the address range can be configured upon determination from entries of the cache memory of the minimum address and the maximum address of one process executed by the processing unit during a previous checking of each entry of the cache memory. This determination can be performed upon request on the MMU. The MMU of the processing unit has a larger address space for a process than the one that is actually in use: indeed, the MMU prevents a process from accessing memory that has not been effected to it, and therefore the MMU overestimates the address range of the objects of the process. In practice, a selection of an address range is performed for each process executed or to be executed by the processing unit.

In another alternative, the selection of an address range in the cache memory can rely on information relative to register assignments in the CPU. Register assignment is the process of assigning a large number of target program variables into the cache memory.

The references may be located in each object stored in each entry of the cache memory by using a predefined object format. The predefined object format can be used so that the length of objects and the location of pointers within each object can be determined by tags in each object. Data of the object (e.g. an integer) are therefore not confused with pointers in the object.

Referring back to FIG. 2, at step S220, the one or more references found in an object of a cache entry are stored in a memory for reuse purpose, at step S240. The memory can also be called scan-pointers for mark phase register. The references point to entries of the cache memory on which objects are references.

Next, at step S230, whether all the entries of the cache memory have been checked is verified. If all entries have not been checked, the remaining lines of the cache memory are checked. If it is verified that all the entries have been checked, the process continues with step S235.

At step S235, it is determined among the objects stored in the cache memory, which objects are not referenced by other objects. The determination is performed based on the stored references that have been located in entries of the cache memory.

Next, at step S240, checked entries are marked to distinguish entries corresponding to objects determined as being not referenced from other entries of the checked entries. Marking an entry can be performed by setting a flag in the cache entry, e.g., modifying a specific bit on the entry.

It is to be understood that marking entries to objects not referenced by others or entries to objects referenced by others is essentially the same because it is possible in both cases to distinguish entries corresponding to objects determined as being not referenced from other entries of the checked entries. The choice of marking entries to objects not referenced by others or entries to objects referenced by others may be a simple design choice, or it may be selected according to a parameter of the cache memory. For instance, a high workload of the cache memory can be related to an increase of the number of objects not referenced by one or more objects on the cache memory. It can also be selected according to the design of the cache memory, for instance, but not limited to, the associativity of the cache memory.

When the marking is complete, that is, all the entries to be marked have been marked, all checked objects that are referenced by one or more objects are easily identifiable within the cache memory.

Next, at step S250, entries corresponding to objects determined as being not referenced are cast out. This is performed in accordance with the marking step. Thus, if entries to objects not referenced by others have been marked, then the marked cache entries of the cache memory are cast out. Inversely, if the entries to objects referenced by others have been marked, then the unmarked cache entries of the cache memory are cast out. Casting out entries typically means that the cache memory is cleared from objects determined as being not referenced. Thus, the cast out entries are flushed and a new object to be cached may be stored thereon. Alternatively, casting out may result in an object corresponding to an entry cast out is not deleted (or at least not entirely) from the structure. However, at least some of the resources (e.g., storage resources) that were previously available for that object are now made available for reclaim. Thus, a new object to be cached can use resources corresponding to a cast out entry. Accordingly, cast out entries result in freeing some resources in the structure—resources which are therefore made available for new objects to be cached.

The proposed method for managing objects stored in a cache memory advantageously allows for maintaining in the cache memory only objects that are referenced by other objects. In particular, this removes unreferenced objects, that is, objects that are not likely to be used during the execution of a process (e.g. an application executed by a CPU). Because the cache memory can be easily cast out from objects determined as being not referenced from other entries of the checked entries, new objects can be recorded in the free entries, which reduces latency while executing a process by the processing unit. Processing thus accelerated and consequently consumes less power. In addition, the proposed method further contributes to reduce power consumption because fewer exchanges between the processing unit and the main memory are required for executing a process. The whole efficiency of the processing unit is therefore improved. As another advantage, the proposed method provides an exact identification of the entries corresponding to objects determined as being not referenced: indeed, and contrary to what is done in the art, the identification of cast out victims is not performed by the usual last-recently-used (LRU) policy and its approximations. As a result, objects that are known not to be referenced by one or more other objects can free-up the cache memory much faster. Unlike a standard scheme for performing garbage collection, the proposed method does not require time consuming access in main memory.

The steps of checking, determining and casting out can be interlaced instead of executing them one after the other. With sufficient algorithm optimization, the references located may not need to be stored all at once, and only a current reference to an object may be stored for a short time, which allows marking of a corresponding entry or marking of all remaining entries. Depending on the actual algorithm implemented, marking an entry corresponding to an unreferenced object might not be necessary, since an entry detected as corresponding to an unreferenced object might be immediately cast out.

Figure 3:
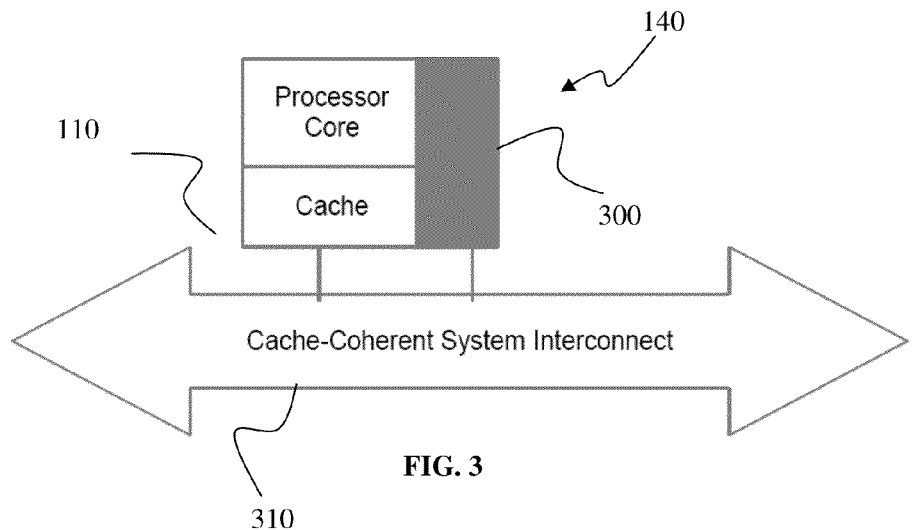
FIG. 3 is an example of the integration of a cache memory garbage collector on a processing unit.

Referring now to FIG. 3, an example of the integration of a cache memory garbage collector 300 on a CPU 140 is illustrated. The CPU 140 includes a cache memory 110 and a processor core for processing data and instructions, e.g., data and instructions of a process of an application. The MMU 120 and the TLB of the CPU are not represented in FIG. 3. It is to be understood that the MMU and the TLB can be integrated on the CPU or can be outside the CPU. Thus, even though, generally, such a MMU/TLB may be considered to be part of the CPU, the MMU/TLB can be used separately from the CPU. Hence, a MMU/TLB set can be within or outside the CPU.

The garbage collector 300 performs the presented method for managing objects stored in the cache memory of the processing unit, e.g. the CPU 140. The garbage collector 300 can be a hardware implementation or a software implementation. In an embodiment, the garbage collector 300 is hardware integrated on the CPU, that is, the garbage collector is tightly integrated with the cache memory 110 and the processor core. A hardware implementation advantageously facilitates the execution of the presented method because hardware environments are heterogeneous, e.g., several types of CPU and cache memory.

The CPU 140 can be a multi processor core, that is, the CPU can include two or more processor cores (not represented on FIG. 3). In the event the CPU is a multi-processor core, the processor cores and their respective cache memories can be interconnected through a cache-coherent system interconnect 310 ensuring that a value written by a processor core is eventually visible by other processor cores and that each processor receives good data from its cache.

Figure 4:
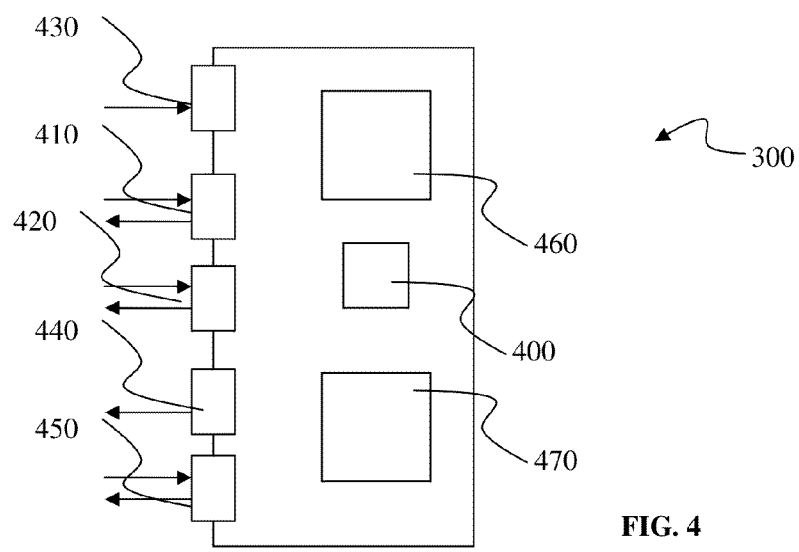
FIG. 4 is an example of a system for implementing a garbage collector on a processing unit.

Referring now to FIG. 4, a system for implementing the garbage collector 300 on a processing unit cache memory 110 is depicted.

The system includes a first interface 410 providing read access and write access to the cache memory. Read access (also referred to as access-read) here includes that the system has permission to access data stored on each entry of the cache memory. Write access (also referred to as access-write) here includes that the system has permission to write or modify data stored on each entry of the cache memory. The first interface may be used by the system during the checking step (S200-S230) and the marking and casting out steps (S240-S250).

The system further includes a second interface 420 for read access to the MMU of the processing unit. In other terms, the second interface allows the system to query the MMU for the purpose of translating a virtual address into a physical address.

The system further includes a memory 470 for storing the references identified within the objects stored in the cache memory.

The system can further include a third interface 430 for receiving register assignments performed in the processing unit. Due to this interface, the system is aware of how large a number of target program variables in the cache memory are assigned. Newly stored references in the cache memory are thus available to the system via this interface.

The system further includes a processing engine 400. The processing engine is adapted for checking in the cache memory the objects including references to other objects and for marking the respective entries of the objects that have been determined as being referenced. The processing engine 400 manages the interfaces 410, 420, and 430 of the system 300, and the memory 470.

Optionally, the system can include a dedicated interface 440 for marking the respective entries of the objects that have been determined as being referenced. In this case, the first interface 410 provides read and write access to the cache memory and cannot be used for marking the referenced objects.

The system can include a register 460 for storing an array of address spaces to be handled. In practice, the addresses of the array may be virtual address spaces. The array can be formed from the selected address ranges in the cache memory.

The system can include a fourth interface 450 for receiving locations of marked cache entries collected from one or more supplementary cache memories of the processing unit. It is to be understood that the fourth interface can also receive locations of unmarked cache entries collected from one or more supplementary cache memories of the processing unit. The fourth interface can allow the system to cooperate with several cache memories, e.g., a CPU having two or more cache memories. Each cache memory can implement a garbage collector able at least to perform the checking step of the presented method, that is, each cache memory can transmit to the system 300 the references found within its respective objects. These references can be stored with the references found by the system, and the checking step can therefore be performed on each entry of one or more supplementary cache memories. Thus, the system 300 has a global knowledge of the referenced objects stored in each line of each cache memory managed by the system 300. Similarly, the system 300 can transmit its references to the other garbage collector of the other cache memories through the fourth interface 450.

The fourth interface 450 can further be used for transmitting to a software level garbage collector locations of marked cache entries. Through this received information, the efficiency of the software level garbage collector is improved.

It is to be understood that the fourth interface 450 can transmit and receive either location of entries to objects not referenced by others or locations of entries to objects referenced by others.

Figure 5:
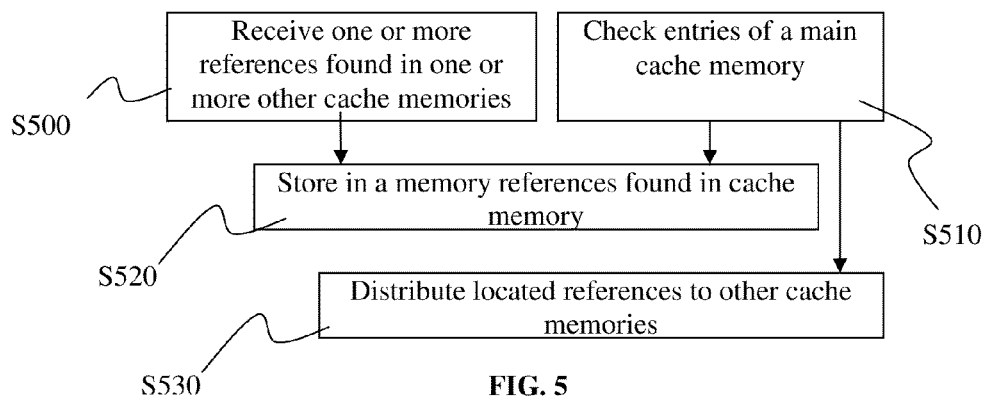
FIG. 5 is a flowchart depicting an embodiment of a method for managing objects stored on several cache memories of a processing unit.

Referring now to FIG. 5, a flowchart is illustrated depicting an embodiment of a method for managing objects stored on several cache memories of a processing unit from the point of view of a system for implementing a garbage collector on a processing unit cache memory, as illustrated on FIG. 4.

At step 510, entries of the cache memory are checked for whether the object stored includes one or more references to one or more other objects stored in the cache memory. This process is similar to the steps S200-S230 in FIG. 2. At step S520, the references found in the cache memory are stored in the memory, e.g. the memory 470 of the system 300 depicted on FIG. 4.

Meanwhile, at step S500, the system receives one or more references found in other cache memories. As previously discussed, each cache memory includes a garbage collector able at least to perform the checking step of the presented method, that is, each cache memory can transmit to the system 300 the references found within its respective objects. Similarly, at step S520, the references found in all the other cache memories are stored in the memory, e.g. the memory 470 of the system 300 depicted on FIG. 4.

Located references of step 510 are distributed to the other cache memories at step S530. Hence, each garbage collector benefits from a global view of the referenced objects on each cache memory. This advantageously improves the efficiency of the marking step in each cache memory and decreases the rate of false positives of checking steps.

It is to be understood that the steps S500-S540 may be performed concomitantly.

The transmission of references at steps S500 and S530 may be performed using a cache-coherent system interconnect, as the one 310 depicted on FIG. 3.

The marking of the respective entries of each cache memory can be performed by the garbage collector of each cache memory, or only by one of the garbage collectors. In other terms, there can be a central garbage collector able to mark entries of the cache memories, or several garbage collectors able to mark the entries of the cache memories. The marking may be centralized or distributed.

When a reference is transferred from one garbage collector to another one, the reference can be a virtual address or a physical address. Using a physical address involves a locally performed translation by the system implementing the garbage collector, that is, before the reference is transmitted to the other cache memories. This advantageously improves the TLB hit rate. In addition, only references found in the TLB can be kept and transmitted. This improves the overall performance of the process of FIG. 5 because a TLB miss harms the performance of the garbage collector having identified the reference causing the TLB miss. Hence, locating in each entry of the cache memory one or more references to one or more other objects includes, before transferring one or more located references to the other cache memories, requesting the MMU of the processing unit having the garbage collector implemented thereon, whether the one or more located references are stored in the MMU.

On the contrary, when using a virtual address, the translation is performed at the garbage collector receiving the reference. This improves the speed of the garbage collector performing the checking step.

The flowchart and block diagrams in the figures illustrate the architecture, functionality, and operation of possible embodiments of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative embodiments, the functions noted in the block can occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for managing objects stored in a cache memory of a processing unit, wherein said cache memory comprises a set of entries, each of said entries corresponding to an object of said objects, the method comprising:
   checking, for each entry of at least a subset of entries of said set of entries of said cache memory, whether said object corresponding to each said entry comprises at least one reference to at least one other object stored in said cache memory, and storing said references, wherein said checking further comprises locating, for each entry of said subset of entries, at least one reference to at least one other object by:
   selecting an address range in said cache memory;
   identifying in said selected address range words arranged in accordance with data alignment of said cache memory as virtual references comprising the at least one reference to at least one other object;
   requesting a memory management unit of said processing unit to perform translations of the virtual references into physical references to confirm that the virtual references map to physical addresses of said cache memory; and
   determining that one or more of the virtual references are not references to at least one other object based on an address translation failure of the memory management unit that fails to confirm that one or more of the virtual references map to physical addresses of said cache memory;
   determining among said objects stored in said cache memory, which objects are not referenced by other objects, based on said stored references;
   marking entries as checked to distinguish entries corresponding to objects determined as being not referenced from other entries of said checked entries; and,
   casting out according to said marking, entries corresponding to objects determined as being not referenced.

2. The method according to claim 1, wherein said checking further comprises locating, for each entry of said subset of entries, the at least one reference to at least one other object by identifying type information of said object corresponding to each said entry to determine the size of said object.

3. The method according to claim 1, wherein said selected address range has a given probability to coincide with application data.

4. The method according to claim 3, wherein said address range is selected by at least one of an operating system and an application.

5. The method according to claim 3, wherein said address range is selected upon determination from said subset of entries of a minimum address and a maximum address of one process executed by said processing unit during a previous checking of said subset of entries.

6. The method according to claim 1, wherein said checking is further performed for a set of entries of a main memory.

7. The method according to claim 1, wherein said checking is further performed on at least a subset of entries of a set of entries of at least one supplementary cache memory.

8. A system for implementing a garbage collector on a processing unit cache memory, comprising:
   a first interface that provides read and write access to said cache memory;
   a second interface that provides read access to a memory management unit of said processing unit;
   a third interface that receives register assignments performed in said processing unit;
   a memory that stores at least one reference to at least one object; and,
   a processing engine that manages said objects stored in said processing unit cache memory, wherein said cache memory comprises a set of entries, each of said entries corresponding to an object of said objects, wherein said processing engine:
   checks, for each entry of at least a subset of entries of said set of entries of said cache memory, whether said object corresponding to each said entry comprises at least one reference to at least one other object stored in said cache memory and storing said references wherein said checks locate, for each entry of said subset of entries, at least one reference to at least one other object by:
   selection of an address range in said cache memory;
   identification of said selected address range words arranged in accordance with data alignment of said cache memory as virtual references comprising the at least one reference to at least one other object;
   requesting a memory management unit of said processing unit to perform translations of the virtual references into physical references to confirm that the virtual references map to physical addresses of said cache memory; and
   determination that one or more of the virtual references are not references to at least one other object based on an address translation failure of the memory management unit that fails to confirm that one or more of the virtual references map to physical addresses of said cache memory;
   determines among said objects stored in said cache memory, which objects are not referenced by other objects, based on said stored references;
   marks entries as checked to distinguish entries corresponding to objects determined as being not referenced from other entries of said checked entries; and,
   casts out according to said marking, entries corresponding to objects determined as being not referenced.

9. The system according to claim 8, further comprising a fourth interface for receiving locations of marked cache entries collected from at least one supplementary cache memory of said processing unit.

10. The system according to claim 9, wherein said fourth interface transmits locations of marked cache entries to a software level garbage collector.

11. A computer program product for managing objects stored in a cache memory of a processing unit, wherein said cache memory comprises a set of entries, each of said entries corresponding to an object of said objects, the computer program product comprising:
   a computer readable storage medium having computer readable non-transient program code embodied therein, the computer readable program code comprising:
   computer readable program code configured to perform the steps of:
   checking, for each entry of at least a subset of entries of said set of entries of said cache memory, whether said object corresponding to each said entry comprises at least one reference to at least one other object stored in said cache memory, and storing said references wherein said checking further comprises locating, for each entry of said subset of entries, at least one reference to at least one other object by:
   selecting an address range in said cache memory;

identifying in said selected address range words arranged in accordance with data alignment of said cache memory as virtual references comprising the at least one reference to at least one other object;

requesting a memory management unit of said processing unit to perform translations of the virtual references into physical references to confirm that the virtual references map to physical addresses of said cache memory; and determining that one or more of the virtual references are not references to at least one other object based on an address translation failure of the memory management unit that fails to confirm that one or more of the virtual references map to physical addresses of said cache memory;

determining among said objects stored in said cache memory, which objects are not referenced by other objects, based on said stored references;

marking entries as checked to distinguish entries corresponding to objects determined as being not referenced from other entries of said checked entries; and, casting out according to said marking, entries corresponding to objects determined as being not referenced.

12. The computer program product according to claim 11, wherein said checking further comprises locating, for each entry of said subset of entries, the at least one reference to at least one other object by identifying type information of said object corresponding to each said entry to determine the size of said object.

13. The computer program product according to claim 11, wherein said selected address range has a given probability to coincide with application data.

14. The computer program product according to claim 11, wherein said address range is selected by at least one of an operating system and an application.

15. The computer program product according to claim 11, wherein said address range is selected upon determination from said subset of entries of a minimum address and a maximum address of one process executed by said processing unit during a previous checking of said subset of entries.

16. The computer program product according to claim 11, wherein said checking is further performed for a set of entries of a main memory.

17. The computer program product according to claim 11, wherein said checking is further performed on at least a subset of entries of a set of entries of at least one supplementary cache memory.

* * * * *